US012726971B2

(12) United States Patent
Zhao et al.

(10) Patent No.: US 12,726,971 B2
(45) Date of Patent: Sep. 1, 2026

(54) METHODS AND APPARATUSES FOR RF CALIBRATION BASED ON GUARANTEED AVAILABILITY OF UPLINK CALIBRATION GAPS

(71) Applicant: Sony Group Corporation, Tokyo (JP)

(72) Inventors: Kun Zhao, Malmö (SE); Erik Bengtsson, Eslöv (SE); Jose Flordelis, Lund (SE); Fredrik Rusek, Eslöv (SE); Olof Zander, Södra Sandby (SE)

(73) Assignee: Sony Group Corporation, Tokyo (JP)

( * ) Notice: Subject to any disclaimer, the term of this patent is extended or adjusted under 35 U.S.C. 154(b) by 326 days.

(21) Appl. No.: 18/270,544

(22) PCT Filed: Nov. 24, 2021

(86) PCT No.: PCT/EP2021/082862
§ 371 (c)(1),
(2) Date: Jun. 30, 2023

(87) PCT Pub. No.: WO2022/152442
PCT Pub. Date: Jul. 21, 2022

(65) Prior Publication Data

US 2024/0064727 A1 Feb. 22, 2024

(30) Foreign Application Priority Data

Jan. 15, 2021 (SE) .................................... 2150030-1

(51) Int. Cl.
*H04B 17/12* (2015.01)
*H04B 17/11* (2015.01)
(Continued)

(52) U.S. Cl.
CPC .......... *H04W 72/121* (2013.01); *H04B 17/11* (2015.01)

(58) Field of Classification Search
CPC .... H04W 72/121; H04W 72/23; H04B 17/11; H04B 17/12; H04B 17/13; H04B 17/19; H04B 17/23; H04B 17/104; H04B 17/354
(Continued)

(56) References Cited

U.S. PATENT DOCUMENTS 10,014,916 B2 * 7/2018 Yuan .................... H04B 17/373
11,671,863 B2 * 6/2023 Akkarakaran .......... G01S 5/021
370/252

(Continued)

FOREIGN PATENT DOCUMENTS

CN 108432319 A 8/2018
CN 111417202 A 7/2020

(Continued)

OTHER PUBLICATIONS

Vieira, Joao, et al. "Reciprocity calibration for massive MIMO: Proposal, modeling, and validation." IEEE Transactions on Wireless Communications 16.5 (2017): 3042-3056. (Year: 2017).*

(Continued)

*Primary Examiner* — Christopher M Crutchfield
*Assistant Examiner* — Syed Ahmed
(74) *Attorney, Agent, or Firm* — Tucker Ellis LLP

(57) ABSTRACT

A method of operating a node of a communications network includes obtaining a timing parameter associated with a guaranteed availability of an uplink calibration gap for performing a calibration of one or more radio-frequency components of a wireless communication device connected to the communications network, and based on the timing parameter, allocating at least one resource to the wireless communication device for performing the calibration, wherein the at least one resource has a timing that is in accordance with the guaranteed availability.

20 Claims, 11 Drawing Sheets

(51) Int. Cl.
*H04B 17/13* (2015.01)
*H04B 17/354* (2015.01)
*H04W 72/121* (2023.01)

(58) Field of Classification Search
USPC .......................................................... 370/329
See application file for complete search history.

(56) References Cited

U.S. PATENT DOCUMENTS

| | | | | |
|---|---|---|---|---|
| 11,985,010 | B2 * | 5/2024 | Chen | H04L 25/0204 |
| 12,058,716 | B2 * | 8/2024 | Yerramalli | H04W 72/02 |
| 12,119,888 | B2 * | 10/2024 | Xing | H04B 1/04 |
| 2014/0269502 | A1 * | 9/2014 | Forenza | H04B 7/024 370/328 |
| 2018/0205468 | A1 | 7/2018 | Rao | |
| 2019/0222326 | A1 | 7/2019 | Dunworth et al. | |
| 2019/0386752 | A1 | 12/2019 | Zhou et al. | |
| 2020/0029345 | A1 | 1/2020 | Malik et al. | |
| 2021/0409128 | A1 * | 12/2021 | Raghavan | H04B 7/0452 |
| 2023/0100583 | A1 * | 3/2023 | Niu | H04W 24/10 |
| 2023/0198637 | A1 * | 6/2023 | Xing | H04B 1/04 375/262 |

FOREIGN PATENT DOCUMENTS

| | | | |
|---|---|---|---|
| EP | 4278483 | A1 | 11/2023 |
| WO | WO-2019063632 | A1 | 4/2019 |

OTHER PUBLICATIONS

International Search Report and Written Opinion from corresponding International Application No. PCT/EP2021/082862, mailed on Apr. 5, 2022, 16 pages.

Office Action and Search Report from corresponding Swedish Application No. 2150030-1, mailed on Oct. 5, 2021, 9 pages.

* cited by examiner

FIG. 4

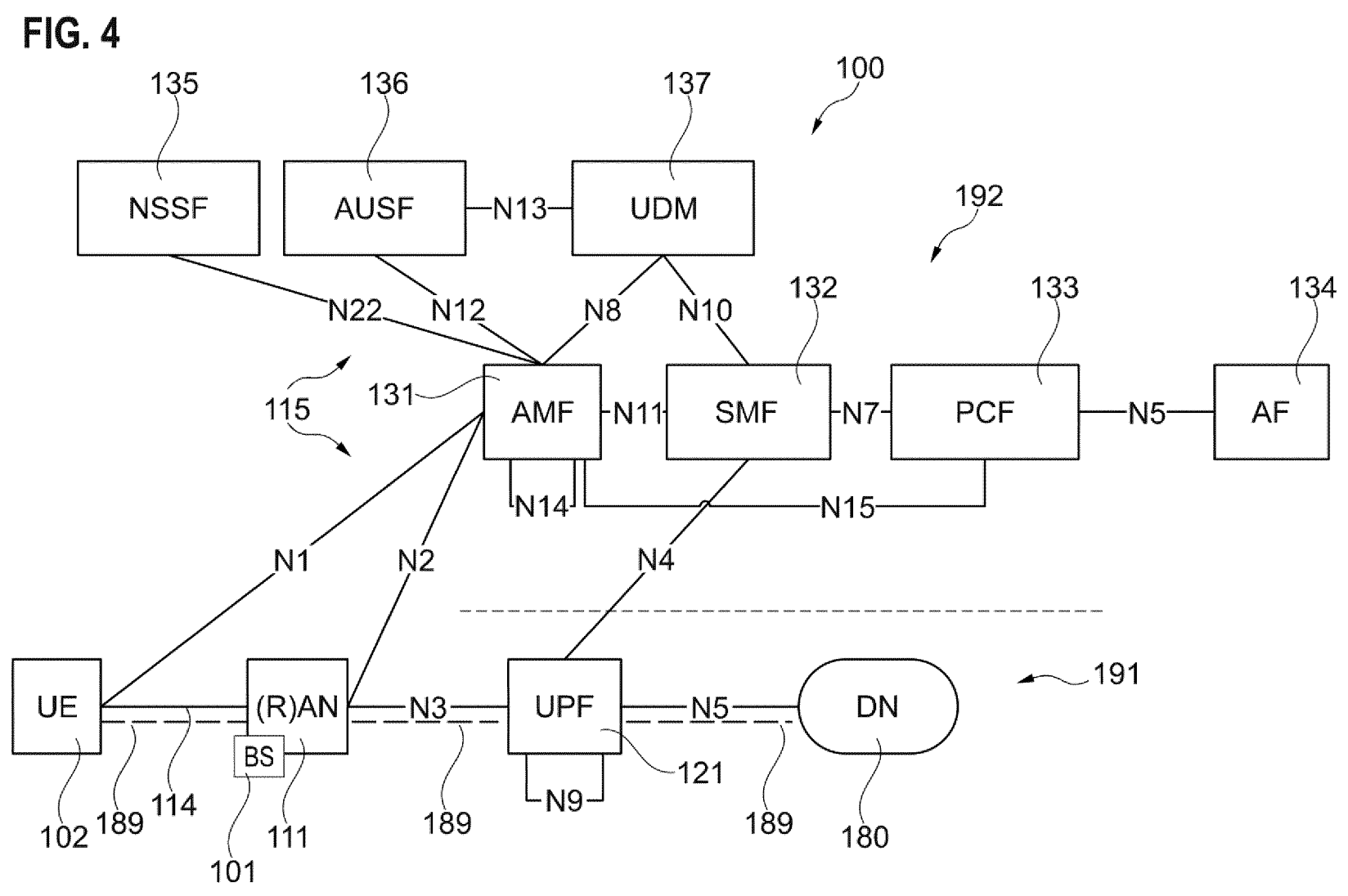

100
192
191
AF 134
N5
PCF 133
N7
N15
SMF 132
N10
N11
N4
UDM 137
N8
N13
AMF 131
N14
AUSF 136
N12
N22
NSSF 135
115
N1
N2
DN 180
N5
189
UPF 121
N9
N3
189
(R)AN 111
BS 101
114
189
UE 102

101
BS
102
UE
103
UE
601
602
603
8005
2005: Timing parameter
8010
11010: Request
8015
11010: Request
8020
11015: Scheduling message
8030
11020: Calibration signals
8025
11020: Calibration signals
Calibration
Calibration
8031
8026
301
301
322
322

METHODS AND APPARATUSES FOR RF CALIBRATION BASED ON GUARANTEED AVAILABILITY OF UPLINK CALIBRATION GAPS

BACKGROUND

Wireless communication using wireless communication devices (UEs) is widespread. Electromagnetic waves are used to transmit signals encoding data. Wireless interfaces of the participating devices employ radio-frequency (RF) components. From time to time, a calibration of the RF components may be required.

While performing the calibration, a transmission of payload data can be temporarily suspended, to allow the UE to, e.g., transmit calibration signals and/or run self-checks. Such suspending of the transmission of payload data is sometimes referred to as an uplink calibration gap (UCG).

It has been observed that performing the calibration at a UE can cause interference at one or more further UEs and/or at a base station. Further, finding an appropriate timing for the UCG can be challenging. Also, where resources are allocated to a UE performing the calibration, scheduling of the UE and/or further UEs can be complicated.

SUMMARY

Accordingly, there is a need for advanced techniques of performing a calibration of one or more RF components. There is a need for advanced techniques of configuring the calibration.

This need is met by the features of the independent claims. The features of the dependent claims define embodiments.

A method of operating a node of a communications network includes obtaining a timing parameter. The timing parameter is associated with a guaranteed availability of an uplink calibration gap for performing a calibration of one or more RF components of a UE.

The UE is connected to the communications network. The method also includes allocating at least one resource to the UE for performing the calibration. The at least one resource has a timing that is in accordance with the guaranteed availability.

For example, the node could be a base station of the communications network.

A computer program or a computer-program product or a computer readable storage medium includes program code. The program code can be loaded and executed by at least one processor. Upon loading and executing the program code, the at least one processor performs a method of operating a node of a communications network. The method includes obtaining a timing parameter. The timing parameter is associated with a guaranteed availability of an uplink calibration gap for performing a calibration of one or more RF components of a UE. The UE is connected to the communications network. The method also includes allocating at least one resource to the UE for performing the calibration. The at least one resource has a timing that is in accordance with the guaranteed availability.

A node of a communications network includes a control circuitry. The control circuitry is configured to obtain a timing parameter. The timing parameter is associated with a guaranteed availability of an uplink calibration gap. The uplink calibration gaps for performing a calibration of one or more RF components of a UE that is connected to the communications network. The control circuitry is further configured to allocate at least one resource to the UE for performing the calibration based on the timing parameter. The at least one resource has a timing that is in accordance with the guaranteed availability.

A method of operating a UE connectable to a communications network includes obtaining a timing parameter. The timing parameter is associated with a guaranteed availability of an uplink calibration gap for performing a calibration of one or more RF components of the UE. The method also includes obtaining an indication of at least one resource allocated to the UE prior to performing the calibration. A timing of the at least one resource is in accordance with the guaranteed availability.

A computer program or a computer-program product or a computer readable storage medium includes program code. The program code can be loaded and executed by at least one processor. Upon loading and executing the program code, the at least one processor performs a method of operating a UE connectable to a communications network. The method includes obtaining a timing parameter. The timing parameter is associated with a guaranteed availability of an uplink calibration gap for performing a calibration of one or more RF components of the UE. The method also includes obtaining an indication of at least one resource allocated to the UE prior to performing the calibration. A timing of the at least one resource is in accordance with the guaranteed availability.

A UE connectable to a communications network includes a control circuitry. The control circuitry is configured to obtain a timing parameter associated with a guaranteed availability of an uplink calibration gap for performing a calibration of one or more RF components of the UE. The control circuitry is further configured to obtain an indication of at least one resource that is allocated to the UE for performing the calibration, prior to performing the calibration. A timing of the at least one resource is in accordance with the guaranteed availability.

A method of operating a UE is provided. The UE is connectable or connected to a communications network. The method includes communicating at least one control message between the UE and the communications network. The at least one control message includes assistance information for performing a calibration of one or more RF components of the UE. The method includes performing the calibration in accordance with the assistance information.

For instance, the assistance information could include a timing of an uplink calibration gap. A start time and/or an end time of the uplink calibration gap could be indicated.

The assistance information could include a request for an uplink calibration gap. A further one of the at least one control message could then include a positive or a negative acknowledgment of the request.

The at least one control message could be indicative of the calibration having been completed.

The at least one control message could include a network trigger for triggering the calibration at the UE.

It is to be understood that the features mentioned above and those yet to be explained below may be used not only in the respective combinations indicated, but also in other combinations or in isolation.

BRIEF DESCRIPTION OF THE DRAWINGS

FIG. 4 schematically illustrates an example implementation of a communications network (NW) as a cellular NW.

DETAILED DESCRIPTION OF EMBODIMENTS

Figure 1:
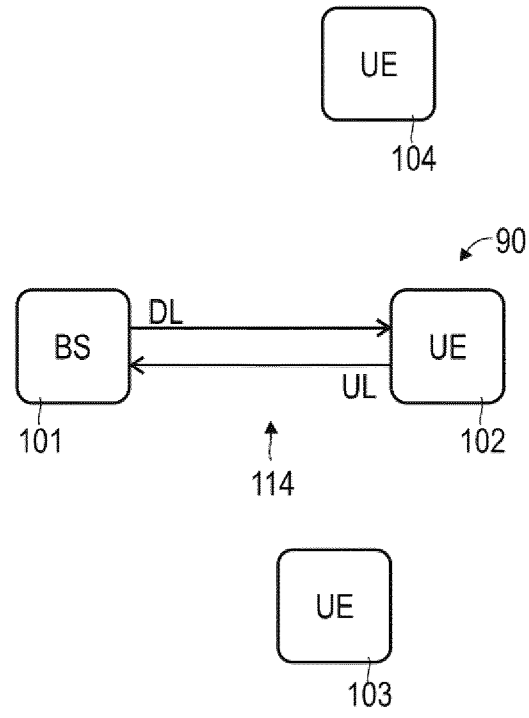
FIG. 1 schematically illustrates a communication system including a UE and a base station according to various examples.

Some examples of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

In the following, examples of the disclosure will be described in detail with reference to the accompanying drawings. It is to be understood that the following description of examples is not to be taken in a limiting sense. The scope of the disclosure is not intended to be limited by the examples described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection.

Functional blocks may be implemented in hardware, firmware, software, or a combination thereof.

Hereinafter, various techniques of wirelessly transmitting and/or receiving (communicating) payload data in a communication system will be described. Payload data can be data on Layer 3 or higher, e.g., Layer 7. Payload data could be application data, e.g., of one or more applications executed by the UE such as an Internet browser, messaging, social media, multimedia streaming. Payload data can also include higher-layer control messages, e.g., Radio Resource Control (RRC) control messages.

A communication system can include multiple UEs and/or nodes that participate in a transmission of payload data. A UE operates one or more RF components. These radio frequency components can include RF switches, tunable RF filters, amplifiers, phase shifters, and/or mixers, etc.

It has been observed that for a reliable transmission of payload data, it is oftentimes helpful to perform a calibration of one or more of such RF components from time to time. This, in particular, applies for comparably high frequencies of the carriers, e.g., above 6 GHz or even above 15 GHz.

Generally in the various examples disclosed herein, performing the calibration can include setting operational properties of the one or more RF components. For instance, an RF clock can be tuned to a certain reference phase. Amplifiers can be calibrated to a certain reference gain; a frequency response of amplifiers can be measured to compensate for non-linearities. Phase relationships between multiple antenna elements used for Multiple Input Multiple Output (MIMO) transmission can be calibrated. Transmit power levels can be calibrated. And adjacent channel leakage ratio (ACLR) can be detected and the RF components can be set accordingly to compensate for the leakage. A further example of performing the calibration can include adjusting or reducing timing offsets between multiple antenna panels of the UE (antenna panels will be discussed in connection with FIG. 3): There may be some residual timing offsets in the timing references between panels, e.g., induced by temperature differences and time-varying (drift). Even small timing offset can have a severe impact on positioning estimates based on time-difference-of-arrival measurements by the UE.

Oftentimes, such performing of a calibration of one or more RF components can include a respective UE transmitting signals using the RF components (these signals will be labeled calibration signals; they could be of arbitrary shape or even encode data). One or more properties of the operation of the one or more RF components can be monitored when transmitting the calibration signals and based on such monitoring, it may then possible to set operational properties of the one or more RF components or adjust the transmitting and/or receiving in accordance with sensed operational properties. For example, a pre-distortion vector can be updated. A self-calibration is thus possible.

Because transmitted calibration signals are monitored, the calibration can also be referred to as uplink (UL) calibration.

The calibration can be performed during an uplink calibration gap (UCG). During the uplink calibration gap, the transmission of payload can be temporarily suspended, in order to enable the UE to perform the calibration. More generally, according to the various examples described herein it would be possible to suspend all transmissions to and from the communications network during the UCG. After the calibration, payload data can be communicated again. Thus, a base station (BS) schedules the UCG so that the transmission of payload data is temporarily suspended.

Various techniques facilitate the UE performing the calibration. According to the techniques described herein, it is possible to reduce a risk that the calibration causes interference to other devices. Scheduling of the UCG and—where appropriate—of one or more resources allocated to the UE performing the calibration can be simplified. Control signaling overhead can be reduced according to various examples.

FIG. 1 schematically illustrates a wireless communication system 90 that may benefit from the techniques disclosed herein. The wireless communication system 90 includes a UE 102 and a base station (BS) 101 of a radio-access network (RAN) of a cellular NW 100.

There are further UE 103, UE 104 arranged in a neighborhood of the UE 102. The UE 102—when performing a calibration of one or more RF components—can cause interference to the UE 103, 104 attempting to communicate with the BS 101. Specifically, it would be possible that uplink transmissions from the UE 103 or the UE 104 to the BS 101 are disturbed by the calibration performed by the UE 102. For example, calibration signals can occupy the spectrum and make it difficult to sense the signals of the uplink transmissions.

As a general rule, the techniques described herein may be applicable to cellular NWs of various kinds and types. For instance, the cellular NW 100 may be a 3GPP-standardized cellular NW such as 4G Long Term Evolution (LTE) or 5G NR.

A wireless link 114 is established between the BS 101 and the UE 102. Downlink communication is implemented from the BS 101 to the UE 102. Uplink communication is implemented from the UE 102 to the BS 101.

The UE 102 may be one of the following: a smart phone; a cellular phone; a tablet PC; a notebook; a computer; a smart TV; a machine type communication device; an IOT device; etc.

Further details of the BS 101 and the UE 102 are explained in connection with FIG. 2.

Figure 2:
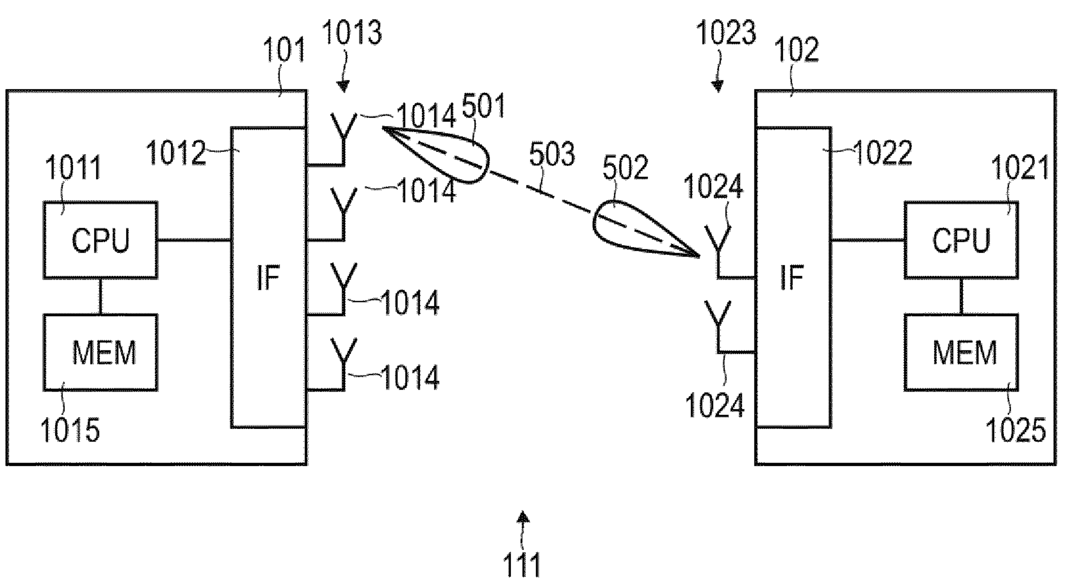
FIG. 2 schematically illustrates details of the UE and the base station according to various examples.

FIG. 2 illustrates details with respect to the BS 101. The BS 101 includes control circuitry that is implemented by a processor 1011 and a non-volatile memory 1015. The processor 1011 can load program code that is stored in the memory 1015. The processor 1011 can then execute the program code. Executing the program code causes the processor to perform techniques as described herein, e.g.: transmitting and/or receiving signals encoding payload data to and/or from the UE 102, to thereby participate in a transmission of payload data between the BS 101 and the UE 102; temporarily suspend said transmission of the payload data during an UCG; determining at least one resource—i.e., a time-frequency resource of a time-frequency resource grid—allocated to the UE 102 performing the calibration and during the UCG; providing a configuration associated with said performing of the calibration to the UE 102, the configuration defining one or more properties of the calibration, e.g., a timing of the UCG, at least one resource allocated to the UE 102 performing the calibration, one or more beams to be used for performing the calibration, and/or calibration signals to be used when performing the calibration; scheduling an UCG; scheduling multiple UEs, e.g., to share one or more resources or to use different resources; etc.

FIG. 2 also illustrates details with respect to the UE 102. The UE 102 includes control circuitry that is implemented by a processor 1021 and a non-volatile memory 1025.

The processor 1021 can load program code that is stored in the memory 1025. The processor can execute the program code. Executing the program code causes the processor to perform techniques as described herein, e.g.: transmitting and/or receiving signals encoding payload data to and/or from the base station 101, to thereby participate in a transmission of payload data between the base station 101 and the UE 102; temporarily suspending said transmission of the payload data during an UCG; performing the calibration during the UCG, wherein said performing of the calibration may include transmitting calibration signals; monitoring transmitting of calibration signals when performing the calibration and setting one or more operational properties of one or more RF components of a wireless interface of the UE 102 based on said monitoring; obtaining a configuration associated with said performing of the calibration from the BS 101, the configuration defining one or more properties of the calibration, e.g., a timing of the UCG, at least one resource allocated to the UE 102 for performing the calibration, one or more beams to be used for performing the calibration, and/or calibration signals to be used when performing the calibration, etc.

FIG. 2 also illustrates details with respect to communication between the BS 101 and the UE 102 on the wireless link 114. The BS 101 includes an interface 1012 that can access and control multiple antennas 1014. Likewise, the UE 102 includes an interface 1022 that can access and control multiple antennas 1024.

While the scenario of FIG. 2 illustrates the antennas 1014 being coupled to the BS 101, as a general rule, it would be possible to employ transmit-receive points (TRPs) that are spaced apart from the BS.

The interfaces 1012, 1022 can each include one or more TX chains and or more RX chains, implemented by RF components. For instance, such RX chains can include low noise amplifiers, analogue to digital converters, mixers, etc. Analog and/or digital beamforming would be possible. Such and other RF components can be subject to calibration, as explained in various examples herein.

Phase-coherent communicating can be implemented across the multiple antennas 1014, 1024. Thereby, the BS 101 and the UE 102 implement a MIMO communication system.

As a general rule, the receiver of the MIMO communication system receives a signal y that is obtained from an input signal x multiplied by a radio channel matrix H.

The radio channel matrix H defines the channel transfer function at a certain subcarrier of an OFDM system of the wireless link 114. The number of independent columns or rows of H defines the rank of the radio channel. H may support several transmissions modes, all of them having a number of layers not greater than the rank of the channel. The number of layers of a transmission mode can be called the rank of the transmission mode. The rank can be different for different MIMO transmission modes. For MIMO transmission modes, the amplitude and/or phase (antenna weights) of each one of the antennas 1014, 1024 is appropriately controlled by the interfaces 1012, 1022.

For instance, one possible transmission mode can be a diversity MIMO transmission mode. Another MIMO transmission mode is spatial multiplexing. Spatial multiplexing enables an increase to the data rate if compared to a reference scenario in which a single data stream of similar throughput is used. The data is divided into different spatial streams and these different data streams can be transmitted contemporaneously over the wireless link 114.

The diversity MIMO transmission mode and the spatial multiplexing multi-antenna transmission mode can be described as using multiple beams, the beams defining the spatial data streams. These modes are, therefore, also referred to as multi-beam operation. By using a beam, the direction of the wavefront of signals transmitted by a transmitter of the communication system is controlled. Energy is focused into a respective direction, by phase-coherent superposition of the individual signals originating from each antenna 1014, 1024. Thereby, the spatial stream can be directed. The spatial streams transmitted on multiple TX beams can be independent, resulting in spatial multiplexing multi-antenna transmission; or dependent on each other, e.g., redundant, resulting in diversity MIMO transmission. As a general rule, alternatively or additionally to such TX beams, it is possible to employ RX beams.

FIG. 2 illustrates two beams 501-502 and an associated spatial stream 503. Based on the assumption of beam reciprocity, each TX beam can be associated with an associated RX beam, at the same device, that has corresponding spatial characteristics (and vice versa).

Figure 3:
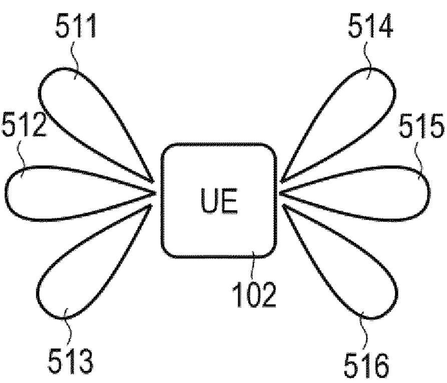
FIG. 3 schematically illustrates multiple beams used by the UE according to various examples.

FIG. 3 schematically illustrates aspects with respect to multiple beams 511-516 used by the UE 102. In the illustrated example of FIG. 3, multiple antenna panels are used, one antenna panel for the beams 511-513 and the second antenna panel for the beams 514-516. Each antenna panel can have a set of antenna elements configured so that the respective beams 511-513, 514-516 point into different solid angles in the surrounding of the UE 102.

FIG. 4 schematically illustrates an example implementation of the cellular NW 100 in greater detail. The example of FIG. 4 illustrates a cellular NW 100 according to the 3GPP 5G architecture. Details of the fundamental architecture are described in 3GPP TS 23.501, version 1.3.0 (2017-09). While FIG. 4 and further parts of the following description illustrate techniques in the 3GPP 5G framework, similar techniques may be readily applied to different communication protocols. Examples include 3GPP LTE 4G and IEEE Wi-Fi technology.

The UE 102 is connectable to the cellular NW 100 via a radio-access network (RAN) 111, typically formed by one or more BSs 101. The wireless link 114 is established between the RAN 111—specifically between one or more of the BSs 101 of the RAN 111—and the UE 102, thereby implementing the communication system 90 (cf. FIG. 1).

The RAN 111 is connected to a core NW (CN) 115. The CN 115 includes a user plane (UP) 191 and a control plane (CP) 192. Application data is typically routed via the UP 191. For this, there is provided a UP function (UPF) 121. The UPF 121 may implement router functionality. Payload data may pass through one or more UPFs 121. In the scenario of FIG. 4, the UPF 121 acts as a gateway towards a data NW (DN) 180, e.g., the Internet or a Local Area NW. The payload data can be communicated between the UE 102 and one or more servers on the DN 180.

The NW 100 also includes an Access and Mobility Management Function (AMF) 131; a Session Management Function (SMF) 132; a Policy Control Function (PCF) 133; an Application Function (AF) 134; a NW Slice Selection Function (NSSF) 134; an Authentication Server Function (AUSF) 136; and a Unified Data Management (UDM) 137. FIG. 3 also illustrates the protocol reference points N1-N22 between these nodes.

The AMF 131 provides one or more of the following functionalities: registration management; NAS termination; connection management; reachability management; mobility management; access authentication; and access authorization. The AMF 131 may keep track of UE context of the UE 102 when a data connection 189 is established and when the UE 102 operates in a connected mode. The AMF 131 may keep track of a need for performing a calibration by the UE 102, e.g., a timing associated with UCGs or a guaranteed availability of UCGs.

A data connection 189 is established by the AMF 131 when the respective UE 102 operates in the connected mode. To keep track of the current NW registration mode of the UEs 102, the AMF 131 sets the UE 102 to Evolved Packet System Connection Management (ECM) connected or ECM idle. During ECM connected, a non-access stratum (NAS) connection is maintained between the UE 102 and the AMF 131. The NAS connection implements an example of a mobility control connection. The NAS connection may be set up in response to paging of the UE 102.

The SMF 132 provides one or more of the following functionalities: session management including session establishment, modify and release, including bearers set up of UP bearers between the RAN 111 and the UPF 121; selection and control of UPFs; configuring of traffic steering; roaming functionality; termination of at least parts of NAS messages; etc.

FIG. 4 also illustrates aspects with respect to the data connection 189. The data connection 189 is established between the UE 102 via the RAN 111 and the UP 191 of the CN 115 and towards the DN 180. For example, a connection with the Internet or another packet data NW can be established. To establish the data connection 189, it is possible that the respective UE 102 performs a random-access (RA) procedure (e.g., a 2-step or 4-step RA procedure), e.g., in response to reception of a paging signal. A server of the DN 180 may host a service for which payload data (sometimes also referred to as application data) is communicated via the data connection 189. The data connection 189 may include one or more bearers such as a dedicated bearer or a default bearer. The data connection 189 may be defined on the Radio Resource Control (RRC) layer, e.g., generally Layer 3 of the OSI model of Layer 2. The data connection can support logical channels, e.g., a Physical Downlink Shared Channel (PDSCH) and a Physical Uplink Shared Channel (PUSCH) for communicating payload data.

Figure 5:
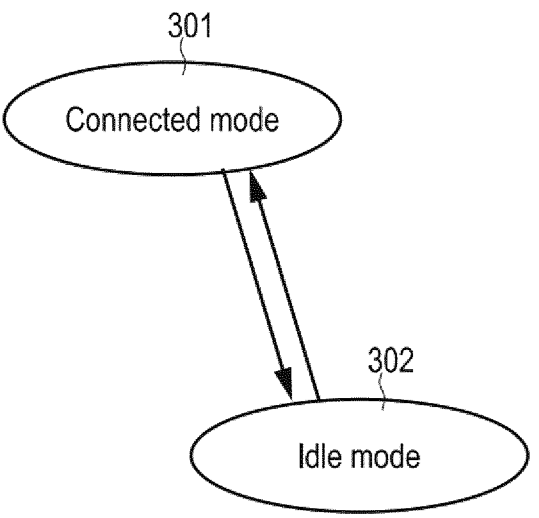
FIG. 5 schematically illustrates multiple operational modes in which a UE can operate.

FIG. 5 illustrates aspects with respect to different NW operational modes 301-302 (also referred to as registration modes) in which the UE 102 can operate. Example implementations of the operational modes 301-302 are described, e.g., in 3GPP TS 38.300, e.g., version 15.0.

During a connected mode 301, the data connection 189 is set up and is maintained set-up. For example, a default bearer and optionally one or more dedicated bearers may be set up between the UE 102 and the NW 100. The receiver of the UE 102 may persistently operate in an active state or may implement a DRX cycle. The DRX cycle includes ON durations and OFF durations, according to a respective timing schedule. During the OFF durations, the receiver is unfit to receive data; an inactive state of the receiver may be activated.

To achieve a power reduction, it is possible to implement an idle mode 302. When the UE 102 operates in the idle mode 302, the data connection 189 is not established. The data connection 189 can be released when transitioning from the connected mode 301 to the idle mode 302, e.g., using a respective RRC release control message. The idle mode 302 is associated with the DRX cycle of the receiver of the UE 102. However, during the on durations of the DRX cycle in idle mode 302, the receiver is only fit to receive paging indicators and, optionally, paging messages. For example, this may help to restrict the particular bandwidth that needs to be monitored by the receiver during the on durations of the DRX cycles in idle mode 302. The receiver may be unfit to receive payload data. This may help to reduce the power consumption—e.g., if compared to the connected mode 301.

To transition from the idle mode 302 to the connected mode 301, the UE 102 can perform a RA procedure. The RA procedure typically includes two or four messages. As a first message, the UE 102 transmits a RA preamble. The RA preamble is selected by the UE from multiple candidate RA preambles. In particular, the RA procedure can be contention-based. This means that it can occur that two or more UEs transmit the same RA preamble using the same at least one resource. It is also possible that two or more UEs transmit different RA preambles using the same at least one resource. Thus, it is possible that collision occurs; the RA procedure is configured to provide for means to resolve such collision, e.g., by performing a random back-off. Also, the RA preambles are designed so that collision can at least in some instances be resolved in code domain. In some scenarios, it is possibly to transmit payload data during the RA procedure (early data transfer, EDT).

Typically, the transmission for transmission of payload data, the UE 102 transitions to the connected mode 301. Then, the payload data can be communicated using the data connection 189. For example, payload data can be communicated on the PUSCH and/or PDSCH. Yet, in some scenarios, it is possible to communicate a size-limited amount of UL payload data even without having the data connection 189 established and prior to performing the RA procedure (i.e., before EDT). In particular, it is possible that multiple repetitive resources are allocated to transmitting signals while the UE operates in the idle mode 302, i.e., without performing a RA procedure. For example, the multiple repetitive resources can be requested and configured prior to transitioning to the idle mode 302, while the UE 102 operates in the connected mode 301. Such repetitive resources are referred to as pre-configured UL resources (PUR). PUR is described in 3GPP Technical Specification (TS) 36.330 V16.3.0 (2020-09), section 7.3d.

When operating in the connected mode 301, it may be required to perform a calibration of one or more RF components at the UE from time to time. Details with respect to a timing of the calibration are explained in connection with FIG. 6.

Figure 6:
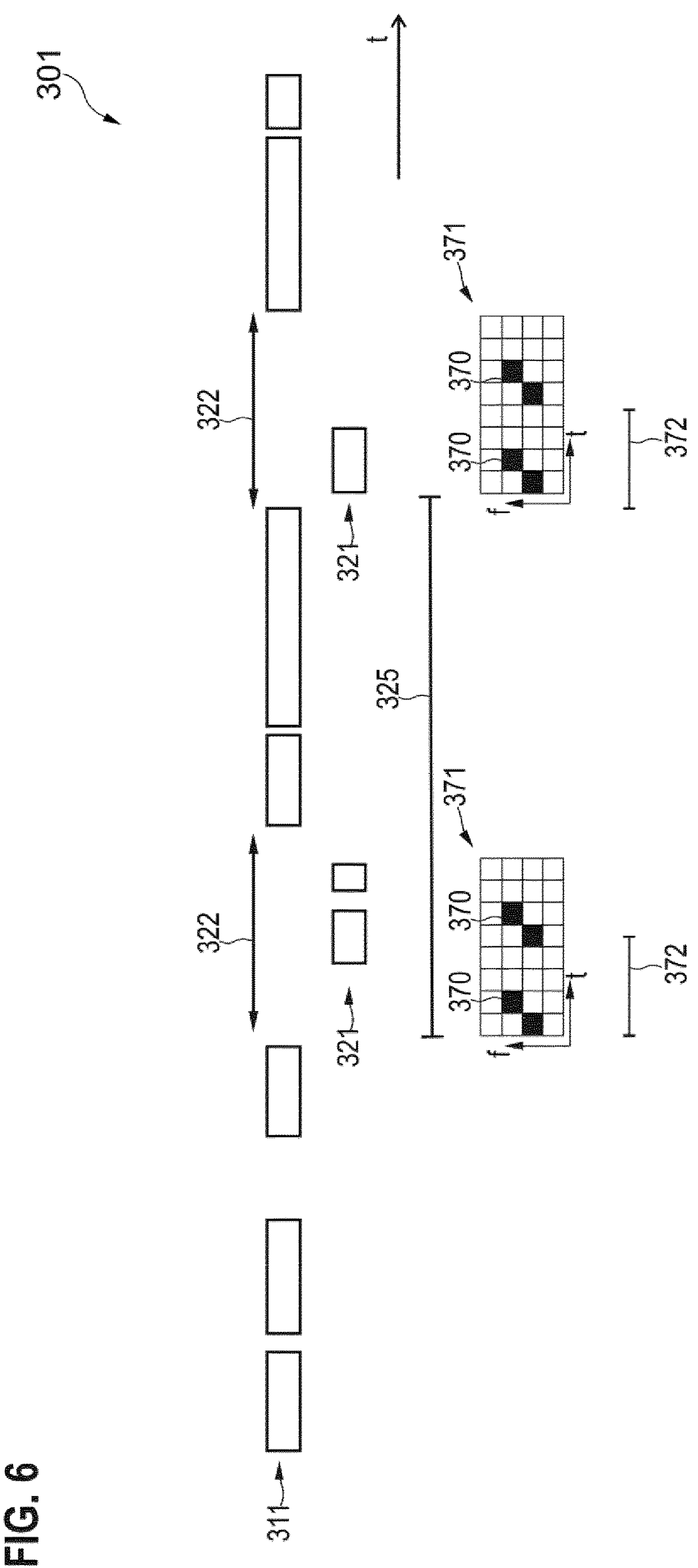
FIG. 6 schematically illustrates uplink calibration gaps during which the UE can perform a calibration of RF components according to various examples.

FIG. 6 schematically illustrates aspects with respect to an UCG 322. FIG. 6 illustrates operation of the UE 102 over time. The UE 102 persistently operates in the connected mode 301. Accordingly, the respective UE context is maintained at the cellular NW, e.g., at the AMF 131 or another CN node, specifying details of the data connection 189 between the UE 102 in the cellular NW.

Illustrated in FIG. 6 are time durations during which the UE 102 communicates payload data 311 using the data connection 189.

The respective transmission of the payload data 311—as well as other transmissions to and from the cellular NW 100—is suspended during the UCGs 322. I.e., the cellular NW schedules the UCGs 322 in that it stops scheduling the payload data transmission during the UCGs 322.

The UE 102 performs the calibration during the UCGs 322. This can include transmitting calibration signals 321. After completion of the calibration, the UCG 322 terminates, and the transmission of payload data can be resumed—without a need of transitioning into the connected mode 301, e.g., without requiring a RA procedure. This means that the UE 102 stays in the connected mode 301 during the UCG 322. The respective context can be retained at the cellular NW 100 during the UCG 322.

FIG. 6 illustrates that the UE 102 may access time-frequency resources 370 (simply, resources hereinafter) to perform the calibration, e.g., to transmit the calibration signals 321. The resources 370 are arranged during the UCG 322. There are generally various options for defining the resources 370.

TABLE 1

Two options for implementing UCGs using either unscheduled resources or scheduled resources. Respective benefits and drawbacks are explained.

| Option | Example description |
| --- | --- |
| Type 1-unscheduled resources | Unscheduled time-frequency resources allow the UE to perform an autonomous selection of the resources in the UCG 322 during which it accesses the spectrum for performing the calibration, e.g., for transmitting calibration signals. There is no requirement for the cellular NW to schedule the UE 102 to use the resources. A scheduling message is not required.<br>The cellular NW may allocate the resources to other signals transmitted by other UEs, e.g., for UL transmission from the other UEs to the cellular NW. This means that the BS can schedule other UEs during the UCG 322. It would be possible that such allocation is restricted in accordance with one or more predefined rules, such as only allocating to UL communication, etc . . .<br>Such scenario is simple from the NW scheduling aspect; however, it leaves the UE under calibration in an uncontrolled situation. Taking a power amplifier pre-distortion calibration as an example, a UE needs to transmit with a high power and probably over a large bandwidth to obtain the power-amplifiers non-linearity property and leaving such transmission uncontrolled , i.e. an uncontrolled environment, can cause severe interference to other communications nearby. |
| Type 2-Scheduled resources | The BS schedules the UE for performing the calibration on specific resources.<br>A scheduling message that is indicative of the scheduled resources may be communicated from the cellular NW to the UE 102. The respective resources allocated to the UE performing the calibration may also be predefined.<br>The UE 102 may only access the spectrum in the resources allocated to performing the calibration, e.g., for transmitting calibration signals.<br>This means that the BS considers that calibration signals will be transmitted at the respective time and frequency positions. Other signals may be allocated to different resources, to mitigate interference.<br>The BS may or may not schedule other UEs during the resources allocated to the UE performing the calibration. In a case in which the BS schedules other UEs, the BS may schedule the other UEs to also perform respective calibrations of their RF components.<br>It would also be possible that the resources are co-allocated to other types of signals, e.g., RA preambles or signals encoding payload data.<br>Using scheduled resources can ensure the calibration to be performed in a controlled environment. However, scheduling can be complicated because even if the periodicity 325 of the UCGs is long compared to a duration 372 of radio frames or any event-triggered gaps are less frequent in the said time-frame, dependencies such as power levels and bandwidth changes imply multiple side conditions on scheduling all users, including those not requiring UCG. For multiple UEs, it becomes difficult to schedule multiple UCGs. |

Figure 7:
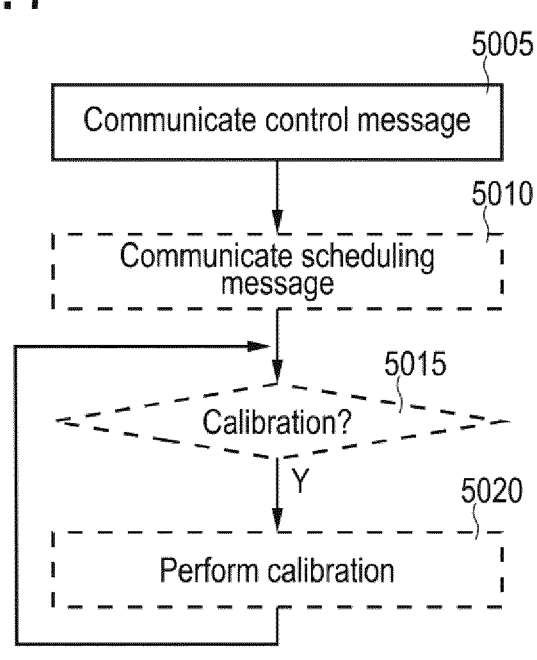
FIG. 7 is a flowchart of a method according to various examples.

FIG. 7 is a flowchart of a method according to various examples. The method of FIG. 7 may be executed by a base station—e.g., the base station 101—and/or a UE—e.g., the UE 102. More specifically, it would be possible that the method of FIG. 7 is executed by the processor 1011 of the base station 101 upon loading program code from the memory 1015. It would also be possible that the method of FIG. 7 is executed by the processor 1021 of the UE 102, upon loading program code from the memory 1025. Optional boxes are illustrated using dashed lines.

At box 5005, at least one control message is communicated. For instance, the base station may transmit one or more of the at least one control message and/or the UE may receive one or more of the at least one control message. At least one of the one or more control messages can be a downlink control message. It would also be possible that at least one of the one or more control messages is an uplink control message.

The at least one control message is indicative of one or more parameters of a calibration to be performed by the UE. The at least one control message configures the calibration or is indicative of the configuration of the calibration. The control message can include assistance information for the UE and/or BS associated with said performing the calibration. The control message can, in other words, assist the UE in performing the calibration; alternatively or additionally, it can assist the BS in performing tasks associated with the calibration, e.g., allocating at least one resource to performing the calibration or scheduling one or more further UEs during the UCG and/or scheduling the UCG.

TABLE 2 illustrates examples of possible information content of the at least one control message.

| | Brief description of content | Example details |
|---|---|---|
| I | Timing of uplink calibration | The at least one control message could be indicative of a timing of the UCG. For instance, a starting time could be indicated. It would be possible to indicate a duration of the UCG. It would be possible to indicate a timing schedule of multiple reoccurring instances of the UCG. It would also be possible that the at least one control message is indicative of the calibration having been completed, so that the UCG terminates. Thereby, the BS may indicate to the UE the timing of the UCG; or vice versa. It is not required to indicate specific resources within the UCG for performing the calibration. Such resources may either be accessed autonomously the by the UE-cf. TAB. 1: unscheduled resources-or a separate scheduling message may be communicated, see box 5010. The timing of the UCG may be requested by the UE. It would also be possible that the timing is instructed by the cellular NW. A request-response pair of multiple control messages may be possible. For example, the UE may request a certain timing and the cellular NW may send a response that is positively or negatively acknowledging the requested timing. The UE may request that the UCG should not occur later than a certain maximum timing that could be signaled by the UE. |
| II | Calibration signals to use | It would be possible that the at least one control message is indicative of one or more calibration signals used by the UE when performing the calibration. For instance, a symbol sequence of the calibration signals could be indicated. This would facilitate code multiplexing with other signals co-allocated to resources during the UCG, by way of reducing interference. |
| III | Beams to use | It would be possible that the at least one control message is indicative of one or more transmit (TX) beams used by the UE to perform the calibration. It would be possible to indicate which beams are selected from a respective codebook. It would be possible to indicate directions of respective beams. It would be also be possible to indicate a beamwidth of such beams. Another option would be to exclude certain beams, directions etc. for being used by the UE during the UCG. The control message can include assistance information that specifically assists the UE in the selection of the appropriate TX beam for performing the calibration. For instance, the assistance information can specify constraints-cf. example V-in selecting the respective beam, e.g., forbidden beams or forbidden regions or forbidden beam widths. |
| IV | Request to perform calibration | The UE may request, at the cellular NW, to perform the calibration. The UE may indicate certain capabilities associated with performing the calibration. The UE may indicate certain hardware constraints associated with performing calibration. For example, the UE may indicate that it requires the calibration as soon as possible. The UE could also request a certain periodicity of the UCG. The UE may indicate that it prefers scheduled or unscheduled resources for performing the calibration, cf. TAB. 1. Thereby, the properties of the calibration can be tailored to the needs of the UE. |
| V | Calibration constraints | For example, timing constraints associated with the UCG could be signaled by the control message. For instance, the UE may indicate certain maximum allowed time offsets between subsequent UCGs. The UE may indicate a maximum allowed time offset between requesting an UCG and the UCG. The BS may indicate a timing parameter associated with the guaranteed availability of the UCG. Beyond timing constraints, other types of constraints are conceivable, e.g., transmit power constraints, beam selection constraints-cf. example VI-etc . . . Based on such calibration constraints, in particular timing constraints, the BS and/or the UE can adjust their operation in order to be able to comply with the calibration constraints. For instance, the BS may not schedule certain UEs during the UCG of another UE. This can help for an overall more robust and reliable communication. |

TAB. 2: Multiple examples of information content of at least one control message communicated between the UE and the cellular NW. For instance, it would be possible that a request-response pair is implemented; here, the UE may initially request a certain configuration of the calibration and then the cellular NW may positively or negatively acknowledge the respective requested configuration. In other examples, it would be possible that the cellular NW proactively triggers a respective configuration of the calibration. The at least one control message may be communicated using Radio Resource Control (RRC) signaling on shared channels—e.g., physical uplink shared channel (PUSCH) and/or physical downlink shared channel (PDSCH).

At box 5010, it is then optionally possible to communicate a scheduling message, cf. TAB. 1, scheduled resources. Here, resources allocated to the UE for performing the calibration can be indicated. The UE can access the spectrum using at least one of these resources allocated to performing the calibration, e.g., to transmit calibration signals.

As a general rule, according to various examples, the scheduling message may be broadcasted by the cellular NW. The scheduling message may also be transmitted in a one-to-one or one-to-many communication, e.g., to all UEs of a scheduling group.

The scheduling message may indicate a single set of at least one resources; or multiple repetitive resources.

The cellular NW—e.g., a scheduler functionality implemented by the BS—can transmit the scheduling message. The UE can receive the scheduling message.

Then, upon a need of performing the calibration—checked at box 5015—the UE can perform the calibration at box 5020. This can include transmitting calibration signals. Typically, the UE may need to perform the calibration when operating in the connected mode 301. The UE—during the UCG—does not participate in payload data transmission. The UE does not transmit data to the cellular NW and does not receive data from the cellular NW. The UE can apply spatial precoding that is not suitable for communicating with the cellular NW; rather, the RF components can be tested using such spatial precoding. The UE can execute certain predefined transit routines as part of the calibration. The UE can stop listing to the cellular NW during the UCG.

As a general rule, according to the various examples described herein, a need to perform the calibration could be determined by monitoring operational characteristics of the one or more RF components subject to the calibration. For instance, if such operational characteristics degrade, the UE may determine that there is a need for performing the calibration. It would also be possible that the UE has a predefined timing defined with respect to the calibration, e.g., specifying that a calibration is to be performed every few seconds or so. Then, the need to perform the calibration may be determined in accordance with the predefined timing.

Figure 8:
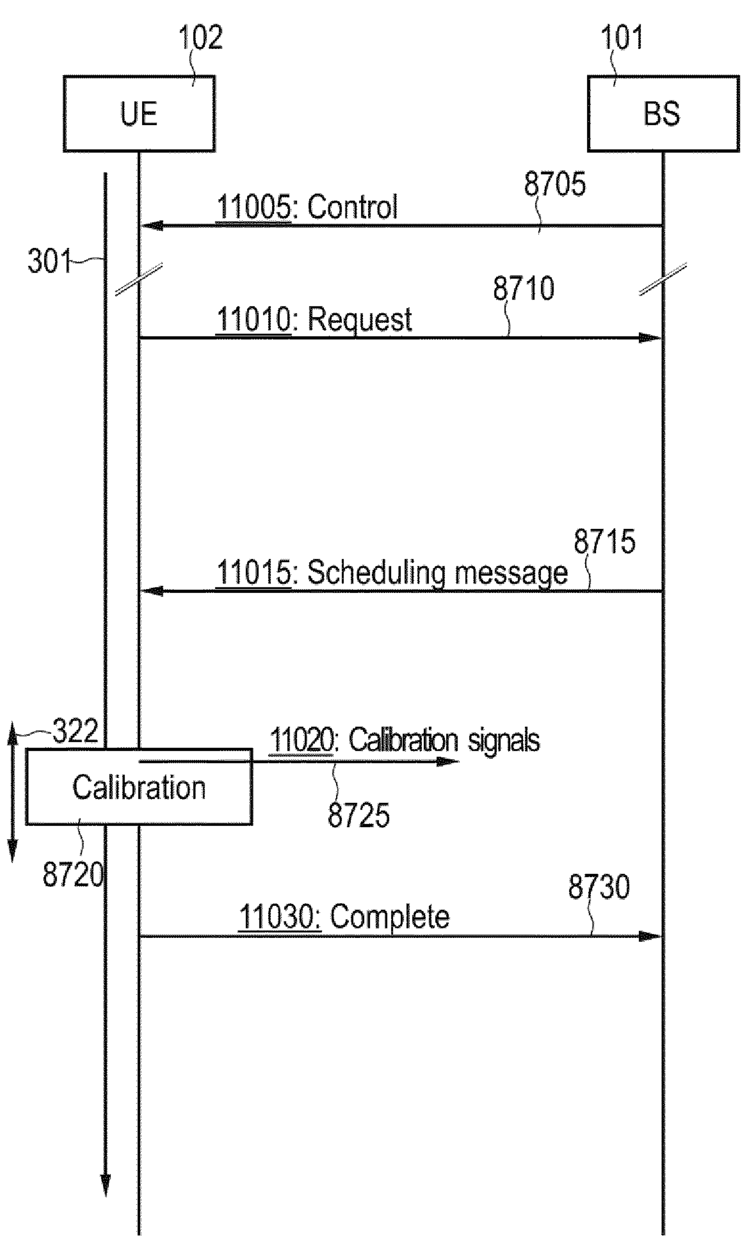
FIG. 8 is a signaling diagram of communication between the UE and the base station related to the UE performing a calibration of its RF components according to various examples.

FIG. 8 is a signaling diagram illustrating communication between the BS 101 and the UE 102. The signaling illustrated in FIG. 8 is related to performing a calibration of one or more RF components at the UE 102. The UE 102 operates in the connected mode 301.

At 8705, the BS 101 transmits a control message 11005 and the UE 102 receives the control message 1005. The control message 11005 can be indicative of a configuration of the calibration. The control message 11005 can include assistance information for performing the calibration. Respective examples have been explained in connection with TAB. 2 above.

As a later point in time, at 8710, the UE 102 transmits a request message 11010. The request message 11010 requests an UCG 322. For instance, the request message could be indicative of a requested starting time of the UCG and/or a requested time duration of the UCG.

At 8715, the BS 101 transmits a scheduling message 11015 to the UE 102. The scheduling message is indicative of at least one resource allocated to the UE 102 performing the calibration. As such, the scheduling message may define a timing of the UCG. In a scenario in which the UE 102 has requested a certain timing of the UCG 322, the at least one resource can be allocated in accordance with the timing.

FIG. 8 illustrates a scenario of using scheduled resources, cf. TAB. 1. It would also be possible that unscheduled resources are used. Here, instead of transmitting the scheduling message 11015 to the UE 102, the BS 101 can transmit a further control message that is indicative of the timing of the UCG—e.g., start time and/or end time and/or duration, without indicating specific resources—and/or positively or negatively acknowledge the request for the UCG.

At 8720, the UE 102 performs the calibration. This includes transmitting calibration signals 11020 at 8725. In the illustrated example, the calibration signals 11020 are transmitted using the at least one resources indicated by the scheduling message 11015. Any communication between the UE 102 and the BS 101 can be prevented.

At 8730, the UE may then transmit a further control message 11030 that is indicative of the calibration having been completed.

Next, details will be explained to a scenario that relies on using scheduled resources for performing the calibration at the UE, cf. TAB. 1.

Various such techniques are based on the finding that there can be situations in which multiple UEs connected to a base station require an UCG for performing respective calibrations. In such a scenario, it can be difficult to implement the scheduling, to, both, timely provide an opportunity for calibrating the RF components of the various UEs, as well as efficiently utilizing the spectrum with reduced interference.

According to the techniques described herein, it is possible to implement the scheduling to provide a timely UCG or UCGs to the multiple UEs, as well as efficiently utilize the spectrum.

According to the techniques described herein, the base station is not required to immediately allocate at least one resource to a UE for performing a calibration—e.g., upon the UE requesting the UCG—, but is rather able to delay the at least one resource in accordance with a guaranteed availability of an UCG.

For example, a timing parameter associated with the guaranteed availability can specify a worst-case delay of the UCG with respect to a reference time point. I.e., the guaranteed availability can specify how long the UE may be required to wait for an UCG in a worst-case scenario. The actual time-to-UCG may be shorter.

The timing parameter can be known to the participating devices—such as the UE and the base station.

Based on the timing parameter, the UE may appropriately adjust one or more transmission parameters used for communicating payload data. Thereby, the UE can be able to reliably operate even under such worst-case conditions. For example, there is a tendency that higher constellations of a modulation scheme require more accurate calibration. Thus, for a reduced guaranteed availability of the UCG, the UE may adjust a transmission of payload data to use less complex constellations.

Such adjusting of one or more transmission parameters due to delaying the at least one resource can have an impact on the instantaneous current consumption at the UE, because the UE may not be able to use optimal precoding or predistortion configurations. However, the overall average current consumption may be reduced, because an optimized overall timing of uplink calibration gaps is facilitated.

On the other hand, the base station may be able to assign multiple UEs that require an uplink calibration to scheduling group. At least one resource allocated to performing the calibration can then be shared between the multiple UEs of the respective scheduling group. In other words, the at least one resource can be co-allocated to multiple UEs performing respective calibrations. Thereby, it is possible to efficiently utilize the spectrum, mitigate interference, as well as simplify the scheduling functionality.

First, details with respect to the operation of the base station will be explained in connection with FIG. 9.

Figure 9:
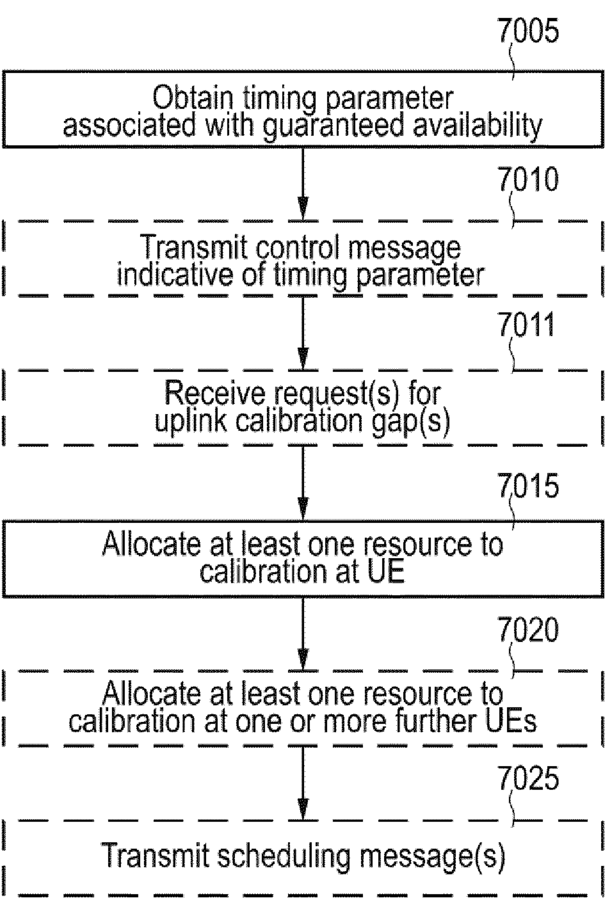
FIG. 9 is a flowchart of a method according to various examples.

FIG. 9 is a flowchart of a method according to various examples. The method of FIG. 9 can be executed by a base station of a cellular network. The base station can be connected to a UE. For example, the method of FIG. 9 could be executed by the base station 101. More specifically, the method of FIG. 9 could be executed by the processor 1011 of the base station 101 upon loading program code from the memory 1015.

At box 7005, a timing parameter associated with a guaranteed availability of an uplink calibration gap for performing a calibration of one or more RF components of the UE is obtained.

Obtaining the timing parameter can mean that the timing parameter is loaded from a memory. For instance, it would be possible that the timing parameter is predefined in accordance with a communication protocol used by the cellular NW and the UE for communicating with each other. Both, the BS as well as the UE can then load the timing parameter from respective local memories. It is not required to communicate a control message that is indicative of the timing parameter.

Obtaining the timing parameter could also mean that the timing parameter is set depending on at least one of a service level of payload data communicated between the UE and the cellular NW via the BS, a coverage level of the UE, or a load situation of the cellular NW.

The service level could indicate certain constraints for latency, jitter and/or bit loss, or other figures of merit. Lower latency and jitter typically require more accurate calibration; such that the guaranteed availability may be higher.

The coverage level can be determined based on sounding one or more spatial propagation paths between the UE and the base station using reference signals. Typically, different modulation and coding schemes may be employed for supporting the communication in a cell-edge scenario if compared to a cell-center scenario; along with different modulation and coding schemes employed by the UE for a transmission of payload data, different a calibration may be required more often or less frequently.

The load situation of the cellular NW can be associated with a count of UEs connected to a respective cell of the BS, or the data rate overall served, etc. Higher load situations can be associated with reduced availability of resources—such that there may be a tendency of reduced guaranteed availability. On the other hand, higher throughputs can be required in high-load situations—such there is an opposite trend of required higher guaranteed availabilities. A sweet spot may be available.

For instance, the timing parameter could be selected from a plurality of candidate timing parameters. Selection criteria as discussed above—i.e., service level, coverage level, and/or load situation—are possible.

The timing parameter can be set taking into account one or more timing constraints obtained from the UE. See TAB. 2, example V. For illustration, the UE may signal that it is not able to operate when the worst-case time offset between two subsequent uplink calibration gaps exceeds a certain value (also cf. FIG. 10, where such worst-case timings of the UCG are plotted for multiple UEs).

There are various implementations possible regarding the timing parameter. Some of these implementations are summarized in TAB. 3.

TABLE 3

Various options for implementations of the timing parameter.

| | Brief description | Example details |
|---|---|---|
| I | Worst-case time offset between two subsequent UCGs | The timing offset between subsequent uplink calibration gaps has been discussed in connection with FIG. 6. The timing parameter can specify an upper limit for this timing offset. The actual timing offset may be smaller, at least for some instances of the uplink calibration gap. |
| II | Periodicity of repetitive resources | It would be possible that a scheduling message schedules multiple repetitive resources that are allocated to the UE performing the calibration. The resources may be repetitive at a certain frequency of occurrence. The frequency of occurrence of these repetitive resources can then specify the timing parameter. This means that the timing of the multiple repetitive resources is in accordance with the guaranteed availability. The UE may select the at least one resource from the multiple repetitive resources prior to performing the calibration. It would be possible that the UE selects the at least one resource from the multiple repetitive resources based on the timing parameter. For instance, a periodicity of the repetitive resources may be shorter than the timing parameter. Then, the UE-in response to a need to perform the calibration-may not select the next occurring at least one resource of the multiple repetitive resources, but may rather select a later occurring at least one resource. |
| III | Worst-case time offset between request and subsequent UCG | The UE may transmit a request for an uplink calibration gap to the base station, e.g., in response to a need for performing the calibration. The base station may then not directly respond with a scheduling message that allocates the at least one resource to the UE performing the calibration; rather, the base station may delay the at least one resource by a certain time delay. The time delay may be as large as the worst-case time offset. |

Upon obtaining the timing parameter, it is possible to transmit a control message to the UE, at box 7010. The control message can be indicative of the timing parameter associated with the guaranteed availability. See, e.g., TAB. 2: example V. The UE can receive the control message. The control message that is indicative of the timing parameter can be transmitted without a specific need for performing a calibration. For instance, the control message at box 7010 can be transmitted as part of a connection establishment procedure for establishing a data connection when transitioning into the connected mode. The control message could also be proactively transmitted by the base station, without a respective request received from the UE and without a request for an uplink calibration gap received from the UE. It would, however, also be possible that the control message is a response to a request for performing the calibration.

According to the various examples described herein, it would be possible that the timing parameter is indicated to the UE in response to a request of the UE to perform the calibration. For instance, the cellular NW may positively acknowledge such request, but instead of directly providing a respective scheduling message indicative of the at least one resource, the cellular NW may indicate the timing parameter. The at least one resource can then be delayed. This would enable to provide the timing parameter on-demand, e.g., taking into account a current load situation in the network, a current coverage scenario of the UE, or a current service level of a payload data transmission.

The control message may be broadcasted, e.g., in a system synchronization block (SSB). It would also be possible that the control message is transmitted in a one-to-one communication from the base station to the UE. For instance, the control message may be communicated using a data connection established between the UE and the cellular NW when the UE operates in the connected mode. The control message may be transmitted using a one-to-many communication, e.g., to all UEs in a scheduling group (as will be explained in detail in connection with FIG. 10).

The control message may use a predefined codebook to indicate the timing parameter. This can be feasible where there is a predefined set of candidate timing parameters from which the timing parameter is selected.

It is not required in all scenarios that the control message that is indicative of the timing parameter is transmitted to the UE. In other scenarios, the UE may autonomously obtain the timing parameter. For instance, the base station and the UE can follow a similar rule set underlying the obtaining of the timing parameter so that even without explicit signaling of the timing parameter, both, the base station, as well as the UE can be aware of the timing parameter.

At optional box 7011, the BS can receive a request for an UCG. This has been discussed in connection with FIG. 8, request 11010.

Box 7011 may sometimes precede box 7010.

At box 7015, at least one resource is allocated to the UE for performing the calibration. This is based on the timing parameter. Specifically, the at least one resource has a timing that is in accordance with the guaranteed availability. This means that the at least one resource is at a point in time that complies with one or more timing restrictions imposed by the timing parameter associated with the guaranteed availability.

The allocation of box 7015 can be triggered by the request optionally received at box 7011. It would also be possible to pre-emptively schedule repetitive resources, cf. TAB. 3, example II.

The at least one resource can be delayed in accordance with the guaranteed availability associated with the timing parameter, cf. TAB. 3, e.g., upon receiving the request at box 7011.

Generally speaking, the at least one resource may be allocated to occur as late as possible (e.g., to co-allocate the at least one resource to multiple UEs to perform the calibrations), but as soon as necessary (to not violate the guaranteed availability).

The at least one resource occurs within an uplink calibration gap. The at least one resource can define the uplink calibration gap. Respective aspects with respect to the uplink calibration gap 322 and the resources 370 have been discussed in connection with FIG. 6.

It is optionally possible that the base station co-allocates the at least one resource to one or more further UEs for performing one or more further calibrations. This is based on the finding that for performing the calibration, the UEs may transmit calibration signals using the at least one resource; however, these calibration signals may not be required to be received by another device or the UEs itself. Rather, the calibration monitors the act of transmitting the calibration signals. Accordingly, multiple UEs transmitting calibration signals using the allocated at least one resource may not significantly impair an accuracy of the calibration. Thus, by co-allocating the at least one resource to multiple UEs, spectral efficiency can be increased. The ability to delay the at least one resource further enables to more flexibly co-allocate the at least one resource to multiple UEs.

It would be possible that the base station receives multiple requests for uplink calibration gaps at box 7011. The multiple requests can be received from multiple UEs. Then, it would be possible that the allocation of the at least one resource is delayed until, e.g., a sufficiently large count of requests have been received. A respective threshold count may be defined. This ensures that the spectrum is efficiently utilized.

At optional box 7025, the base station can transmit one or more scheduling messages that are indicative of the at least one resource to the UE and optionally the one or more further UEs of box 7020. The scheduling message could be broadcasted, e.g., in the SSB. A one-to-many communication to all UEs in a scheduling group would be possible. Scheduling groups are explained in detail in connection with FIG. 10.

Figure 10:
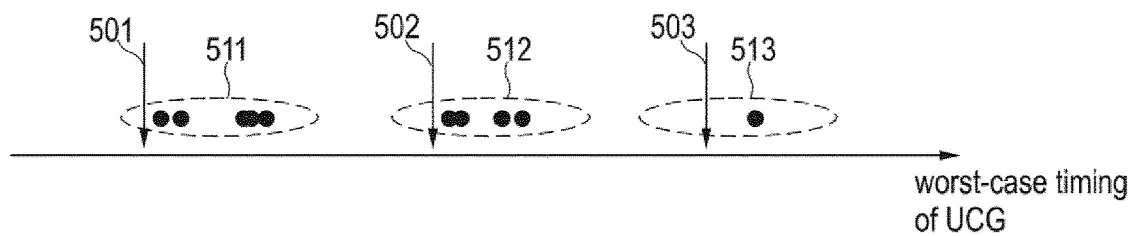
FIG. 10 schematically illustrates scheduling groups according to various examples.

FIG. 10 illustrates aspects with respect to co-allocating resources to multiple UEs for performing respective calibrations.

FIG. 10 schematically illustrates a time distribution of worst-case timings of uplink calibration gaps for multiple UEs, using filled circles.

Different worst-case timings of the UCGs can occur because different UEs face different operation situations, e.g., with respect to the coverage scenario (e.g., cell-center versus cell-edge), the service level required by a transmission of payload data (e.g., with respect to latency, jitter, and/or bit error rate), etc. Different UEs may have different device categories. Subscribers may be associated with different subscription plans.

It would be possible that the various UEs provide respective indications of timing constraints of the calibration to the cellular NW, e.g., using a respective control message. The cellular NW may also determine respective parameters autonomously.

Multiple scheduling groups 511-513 are formed, and each one of the scheduling groups includes such UEs that have comparable worst-case timings of the uplink calibration gaps. The UEs of each scheduling group are then associated with a respective timing parameter 501-503 that meets the upper limit imposed by the worst-case timing of the uplink calibration gaps. At least one respective resource is then co-allocated to the UEs in each one of the scheduling groups 511-513. I.e., these UEs included in a given scheduling group share the at least one resource. UEs in different scheduling groups 511-511 can be scheduled with different resources.

In the illustrated example, the UEs of the scheduling group 511 will benefit from a higher priority in the allocation of at least one resource for performing the respective calibrations if compared to the UEs of the scheduling groups 511, 512. This is because the UEs of the scheduling groups 511 have a shorter guaranteed time-to-UCG.

As a general rule, each scheduling group can include one or more UEs.

Above, a scenario has been described in which worst-case timings of uplink calibration gaps are a criterion for assigning UEs into the same or different scheduling groups. As a general rule, other or further grouping criteria are conceivable. For example, such UEs may be assigned to the same scheduling group that have similar bandwidth requirements with respect to the at least one resource for performing the calibration. For instance, some UEs may require multiple resources in a comparably large bandwidth while other UEs may only require a single resource or a few resources in a comparably small bandwidth. It may make sense to assign such UEs having different bandwidth requirements into different scheduling groups.

Each scheduling group could be associated with a respective group identity. A scheduling message that is transmitted—cf. FIG. 9, box 7020—could be indicative of the respective group identity of the scheduling group of the indicated at least one resource.

This would even enable broadcasting the scheduling messages for multiple scheduling groups. Each UE—being aware of the group identity of the scheduling group it belongs to—can then read the appropriate scheduling message on the broadcast.

Alternatively or additionally, it is possible that the control message that is indicative of the timing parameter—cf. FIG. 9: box 7010— is indicative of a respective group identity of a scheduling group 511-513 that includes UEs being associated with that timing parameter.

Figure 11:
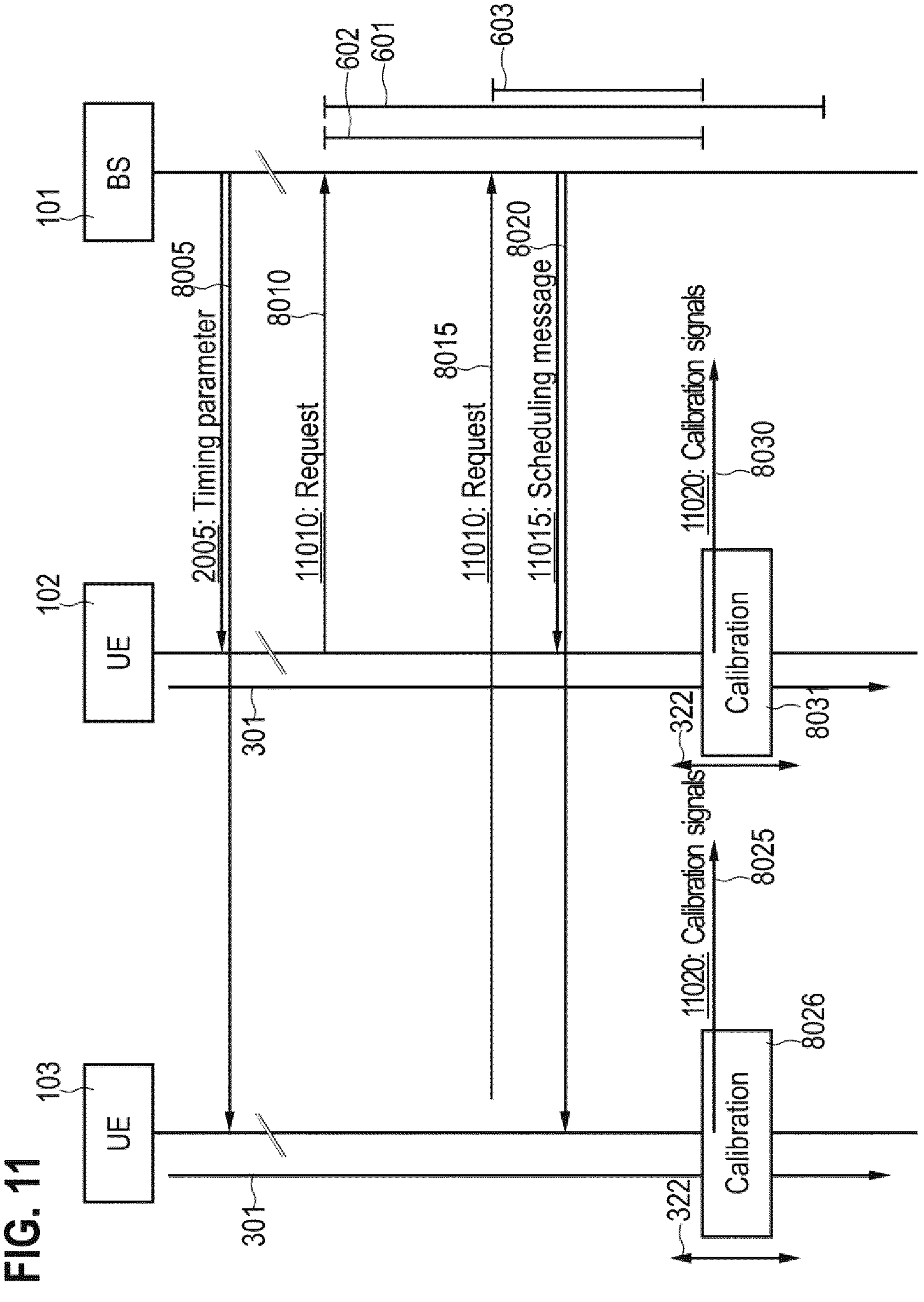
FIG. 11 is a signaling diagram of communication between the UE and the base station related to the UE performing a calibration of its RF components according to various examples.

FIG. 11 is a signaling diagram illustrating communication between the base station 101 and the UE 102, as well as between the base station 101 and the further UE 103. The signaling illustrated in FIG. 11 is related to performing a calibration of one or more RF components at the UE 102 and further related to performing a further calibration of one or more RF components at the UE 103. As such, the signaling diagram of FIG. 11 is an extension of the signaling diagram of FIG. 8.

At 8005, the base station 101 transmits a control message 2005 that is indicative of the timing parameter associated with the guaranteed availability of an uplink calibration gap is a specific implementation of the control message 11005 of FIG. 8. 8005 thus corresponds to box 7010 of the method of FIG. 9.

The control message 2005 could be addressed to all UEs of a scheduling group, here UE 102 and UE 103. For this purpose, a group indicator indicative of the respective scheduling group may be included.

The control message 2005 may be an RRC control message transmitted on PDSCH of a data connection 189 established between the cellular NW 100 and each of the UEs 102, 103.

The control message 2005 could be broadcasted.

At 8010, the UE 102—e.g., in response to a need of performing a calibration—transmits the request message 11010. Details with respect to the request message 11010 have already been explained in connection with FIG. 8.

Upon receiving the request message 11010, the base station 101 does not immediately allocate at least one resource to the UE 1024 performing the calibration; but rather delays the at least one resource and the allocation thereof.

Specifically, the base station 101 waits for further request messages 101 from further UEs. After some time, at 8015, the further UE 103 transmits the request message 11010, e.g., in response to perform a respective calibration of its RF components. Then, the base station 101 can co-allocate at least one resource to the UE 102 and the UE 103 performing respective calibrations and transmit a respective scheduling message 1015 at 8020 to the UE 102 and to the UE 103. The UE 102 and the UE 103 may be part of the same scheduling group (cf. FIG. 10). Details with respect to the scheduling message 1015 have already been explained in connection with FIG. 8.

The allocation of the at least one resource for performing the calibration is based on the timing parameter associated with the guaranteed availability as indicated by the control message 2005 transmitted at 8005. In detail, in the illustrated example, this timing parameter can specify a worst-case time offset 601 between the request message 11010 received from each one of the UEs 102, 103 and the uplink calibration gaps. As illustrated, the actual time offsets 602, 603 between the request messages 11010 received at 8010 and 8015, respectively, are shorter than the worst-case time offset 601.

Now, a variant of the scenario of FIG. 11 will be considered: it would be possible that no further request messages 11010 for respective uplink calibration gaps would have been received by the base station 101 from other UEs beyond the UE 102; then, the base station 101 may have allocated the at least one resource without co-scheduling further UEs, towards the end of the worst-case time offset 602—to thereby ensure that the guaranteed availability is fulfilled.

The UE 102 and the UE 103 can then perform calibrations at 8026 and 8031, respectively, and transmit calibration signals 1020 at 8025 and 8030, respectively, using the co-allocated at least one resource. Details have already been explained in connection with FIGS. 8, 8720 and 8725. The UE 102 and the UE 103 share the UCG 322.

Figure 12:
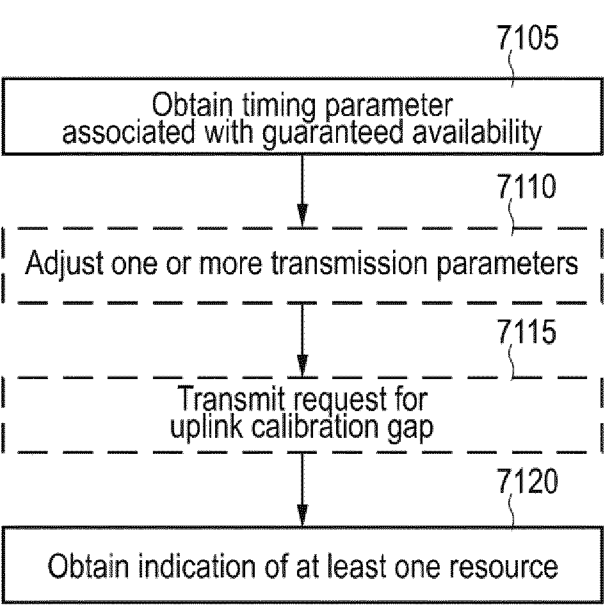
FIG. 12 is a flowchart of a method according to various examples.

FIG. 12 is a flowchart of a method according to various examples. The method of FIG. 12 can be executed by a UE that is connected or connectable to a cellular network through a base station. For instance, the method of FIG. 12 could be executed by the UE 102. More specifically, it would be possible that the method is executed by the processor 1021 upon loading program code from the memory 1025. Optional boxes are labelled with dashed lines in FIG. 12.

At box 7105, a timing parameter is obtained. The timing parameter is associated with a guaranteed availability of an uplink calibration gap for performing a calibration of one or more RF components of the UE.

Comparable to the scenario of FIG. 9: box 7005, multiple variants for obtaining the timing parameter at box 7105 are available. Some of these options are explained above.

In one example, it would be possible that a control message is received from the cellular NW that is indicative of the timing parameter. Then, box 7105 is inter-related with box 7010 of the method of FIG. 9. Details with such control message have also been discussed in connection with FIG. 11 and the control message 2005.

For instance, the control message can use a predefined codebook to indicate the timing parameter. The control message could be broadcasted by the communications network, e.g., in an SSB. The control message could be transmitted in a one-to-many communication to multiple UEs in a scheduling group, as explained above in connection with FIG. 10.

In such an example of receiving a control message from the cellular NW that is indicative of the timing parameter, the timing parameter can be set by a device of the cellular NW, e.g., the base station. In other examples, it would be possible that the UE autonomously determines the timing parameter. For instance, the UE may select the timing parameter from multiple predefined candidate timing parameter is based on one or more selection criteria. Such selection criteria have been explained above in connection with box 7005 of FIG. 9.

At optional box 7110, the UE may adjust one or more transmission parameters based on the timing parameter. For instance, a modulation scheme and/or a coding scheme can be adjusted. Such adjustment can be made in order to be able to meet certain restrictions imposed by the guaranteed availability. For instance, for a comparably in-frequent uplink calibration gap, more robust modulation schemes using lower constellations may be preferred.

At optional box 7115, a request for an uplink calibration gap can be transmitted to the cellular NW. Details with respect to such a request message have been discussed in connection with FIG. 11: request message 1010.

Then, an indication of at least one resource is obtained at box 7120. For example, a scheduling message that is indicative of the at least one resource may be obtained received. The scheduling message could be indicative of a group identity of a scheduling group, as discussed above in connection with FIG. 10. The scheduling message may be broadcasted or communicated in a one-to-one or one-to-many communication.

There are multiple variants of the method of FIG. 12 conceivable.

For illustration, it would be possible that multiple repetitive resources are allocated to the UE for performing the calibration. It would be possible that a single scheduling message that is indicative of the multiple repetitive resources is transmitted to the UE and received by the UE, at box 7105. The timing parameter can then be associated with a periodicity of the multiple repetitive resources. The timing parameter may not be required to be explicitly indicated beyond the indication of the repetitive multiple resources in the scheduling message. Further, the UE at box 7120 may then not require a further scheduling message but may select the at least one resource from the multiple repetitive resources that are indicated by the scheduling message prior to performing the calibration.

Another variation would pertain to receiving a control message that is indicative of the timing parameter in response to transmitting the request for the uplink calibration gap at box 7115; i.e., box 7105 can be executed after box 7115.

The invention claimed is:

1. A method of operating a node of a communications network, the method comprising:

obtaining a timing parameter associated with a guaranteed availability of an uplink calibration gap for performing a calibration of one or more radio-frequency components of a wireless communication device connected to the communications network;

obtaining assistance information for assisting the wireless communication device in selecting one or more transmit (TX) beams to be used by the wireless communication device to perform the calibration; and based on the timing parameter, allocating at least one resource to the wireless communication device for performing the calibration, wherein the at least one resource has a timing that is in accordance with the guaranteed availability.

2. The method of claim 1, further comprising:

co-allocating the at least one resource to one or more further wireless communication devices performing one or more further calibrations.

3. The method of claim 2, further comprising:

wherein the wireless communication device and the one or more further wireless communication devices are associated with the timing parameter, wherein one or more other wireless communication devices are associated with another timing parameter, wherein the method further comprises:

forming multiple scheduling groups of wireless communication devices depending on whether the respective wireless communication devices are associated with the timing parameter or the another timing parameter, wherein the at least one resource is shared between respective wireless communication devices of the respective scheduling group.

4. The method of claim 1, further comprising:

transmitting, to the wireless communication device, a scheduling message indicative of the at least one resource.

5. The method of claim 4, wherein the scheduling message is indicative of a group identity of the respective scheduling group.

6. The method of claim 1, further comprising:

transmitting, to the wireless communication device, a control message indicative of the timing parameter.

7. The method of claim 6, wherein the control message is indicative of a group identity of a scheduling group comprising respective wireless communication devices, the respective wireless communication devices comprising the wireless communication device.

8. The method of claim 1, wherein said obtaining of the timing parameter comprises:

setting the timing parameter depending on at least one of a service level of payload data communicated between the wireless communication device and the communications network, a coverage level of the wireless communication device, or a load situation at the cellular network.

9. The method of claim 8, further comprising:

obtaining, from the wireless communication device, an indication of one or more timing constraints of the calibration, wherein the timing parameter is set in accordance with the one or more timing constraints.

10. The method of claim 1, further comprising:

receiving, from the wireless communication device, a request for performing the calibration, wherein said allocating of the at least one resource is in response to receiving the request.

11. The method of claim 10, further comprising:

upon receiving the request for performing the calibration, delaying the at least one resource in accordance with the guaranteed availability.

12. The method of claim 11, further comprising:

receiving, from one or more further wireless communication devices, one or more further requests for performing one or more further calibrations of one or more further radio-frequency components of the one or more further wireless communication devices, wherein said delaying is until a point in time at which a threshold count of further requests has been received.

13. A method of operating a wireless communication device connectable to a communications network, the method comprising:

obtaining a timing parameter associated with a guaranteed availability of an uplink calibration gap for performing a calibration of one or more radio-frequency components of the wireless communication device;

obtaining assistance information for assisting in selecting one or more transmit (TX) beams to be used by the wireless communication device to perform the calibration; and prior to performing the calibration, obtaining an indication of at least one resource allocated to the wireless communication device for performing the calibration, wherein a timing of the at least one resource is in accordance with the guaranteed availability.

14. The method of claim 13, wherein multiple repetitive resources are allocated to the wireless communication device for performing the calibration, wherein said obtaining of the indication of at least one resource comprises selecting the at least one resource from the multiple repetitive resources based on the timing parameter.

15. The method of claim 13, wherein said obtaining of the timing parameter comprises receiving a control message form the communications network, the control message being indicative of the timing parameter.

16. The method of claim 15, wherein the control message uses a predefined codebook to indicate the timing parameter.

17. The method of claim 15, wherein the control message is broadcasted by the communications network.

18. The method of claim 15, wherein the control message is a response to a request for performing the calibration transmitted by the wireless communication device.

19. The method of claim 15, wherein the control message is communicated using a data connection established between the wireless communication device and the communications network when the wireless communication device operates in a connected mode.

20. The method of claim 15, wherein the control message is indicative of a group identity of a scheduling group comprising a plurality of wireless communication devices, the plurality of wireless communication devices comprising the wireless communication device.

* * * * *